(12) United States Patent
Ang

(10) Patent No.: US 6,507,011 B2
(45) Date of Patent: Jan. 14, 2003

(54) ACTIVE PIXEL COLOR LINEAR SENSOR WITH LINE-PACKED PIXEL READOUT

(75) Inventor: Lin Ping Ang, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/146,576

(22) Filed: May 14, 2002

(65) Prior Publication Data

US 2002/0134917 A1 Sep. 26, 2002

Related U.S. Application Data

(63) Continuation of application No. 09/252,428, filed on Feb. 18, 1999, now Pat. No. 6,388,241.
(60) Provisional application No. 60/075,259, filed on Feb. 19, 1998.

(51) Int. Cl.[7] .............................................. H01L 27/146
(52) U.S. Cl. .................... 250/208.1; 348/275; 348/280; 348/281; 348/308
(58) Field of Search ....................... 250/208.1; 348/266, 348/272, 273, 275, 280, 281, 302, 303, 308

(56) References Cited

U.S. PATENT DOCUMENTS

| 5,148,268 A | 9/1992 | Tandon et al. |
| 5,471,515 A | 11/1995 | Fossum et al. |
| 5,550,653 A | 8/1996 | TeWinkle et al. |
| 5,631,704 A | 5/1997 | Dickinson et al. |
| 5,739,562 A | 4/1998 | Ackland et al. |
| 5,854,656 A | 12/1998 | Noggle |
| 5,870,142 A | * | 2/1999 | Noda et al. .................. 348/266 |

OTHER PUBLICATIONS

Sunetra Mendis, Sabrina E. Kemeny, and Eric R. Fossum, "CMOS Active Pixel Image Sensor," *IEEE Transactions on Electron Devices*. vol. 41, No. 3, Mar. 1994.

Sunetra K. Mendis, Sabrina E. Kemeny, Russell C. Gee, Bedabrata Pain, Quiesup Kim and Eric R. Fossum, "Progress in CMOS Active Pixel Image Sensors," *Proceedings of the SPIE vol. 2172, Charge–Coupled Devices and Solid State Optical Sensors IV (1994)*.

* cited by examiner

Primary Examiner—F. L. Evans
(74) Attorney, Agent, or Firm—Fish & Richardson P.C.

(57) ABSTRACT

A CMOS active pixel color linear image sensor is operable in line-packed readout mode, and at very high speed. In accordance with a preferred embodiment, the sensor is formed entirely on a single-chip and may be further configurable for operation in parallel-packed and/or pixel-packed modes. Line-packed pixel readout is accomplished by spreading same color pixel signal sampled values in storage elements across each of plural readout register arrays in a "cyclic" manner. Facility is introduced for starting the reading of a next pixel (e.g., R pixel 2) even before the previous pixel (R pixel 1) has been read out to increase the effective pixel readout rate.

14 Claims, 14 Drawing Sheets

ACTIVE PIXEL COLOR LINEAR SENSOR WITH LINE-PACKED PIXEL READOUT

CROSS REFERENCE TO RELATED APPLICATIONS

This application is a continuation of U.S. application Ser. No. 09/252,428, filed Feb. 18, 1999, now U.S. Pat. No. 6,388,241, which claims the benefit of the U.S. provisional application serial No. 60/075,259, filed on Feb. 19, 1998.

FIELD OF THE INVENTION

The present specification relates to active pixel color linear image sensors, and more particularly, to ways of sampling pixel signals in an active pixel color linear image sensor.

BACKGROUND

Color linear image sensors typically has separate linear arrays (red, green, blue) arranged in parallel on a single sensor bar. A sensor may then be constructed to move in a scan direction relative to a color image, generally perpendicular to the direction of the arrays. The photosensors in each array are provided with a filter thereon of the associated primary color (e.g. red, green, blue). As the sensor bar including the three rows of photosensors moves along the original image, each portion of the area of the original image is exposed to each of the rows of the photosensors. As each filtered row of photosensors moves past each particular area in the original image, signals according to the different primary color separations of that area are output by the particular photosensors in each row. In this way, three separate sets of signals, each relating to one primary color, will be produced by the arrays of photosensors.

Conventional color linear image sensor technology is mainly of the change coupled device (CCD) type. A CCD reads out a pixel signal by transferring the charge collected under a CCD pixel from one analog shift register to another. By virtue of this repeated lateral transfer, charge transfer efficiency needs to be extremely high to obtain low charge loss. Consequently, a specialized fabrication process must be used to produce a high quality CCD. Generally, such specialized fabrication processes are not CMOS compatible. Hence, CCDs typically suffer from major power dissipation. U.S. Pat. No. 5,841,126, titled, "CMOS Active Pixel Sensor Type Imaging System On a Chip", incorporated herein by reference, describes in detail certain disadvantages of CCDs.

With the advent of CMOS active pixel image sensors and the many advantages that CMOS has to offer (reduction in power dissipation, single chip solution, cost reduction, reliability, etc.), CMOS active pixel sensor technology has begun to replace CCDs as the technology of choice for many imaging applications. Active pixel technology affords a designer the ability to integrate CMOS circuitry and active pixel components on the same silicon substrate—something not done with CCDs. Such integration makes it possible to add functionality to active pixel sensors that would have been either undesirable or impractical to add to a CCD sensor, as will be explained in further detail below. In short, such added functionality makes possible designing a single-chip active-pixel sensor capable of selectively operating in various desirable end user preferred specifications.

At the present time, active pixel sensors have not been made available as color linear image sensors. It would be desirable therefore to provide active pixel color linear sensors which may be used in place of CCD linear sensors.

As explained above, conventional color linear CCD sensors have an array of readout registers for each linear array of photoimaging elements-Red (R) pixels, Green (G) pixels and (B) Blue pixels for a total of three linear arrays. During imaging, charges are integrated and simultaneously readout into one of three corresponding readout register arrays. The charges in individual readout registers in each same array column are then sequentially clocked. For purposes of this application, such readout method shall be termed the "parallel-packed" pixel readout mode. In parallel-packed readout mode, pixel 1 of each of the R, G, and B imaging arrays is made available (read out) at the same time in response to a trigger signal. Similarly, pixel 2 of each of the R, G, and B imaging arrays are read out simultaneously (in parallel) at the subsequent trigger signal.

FIG. 1 shows a block diagram of a conventional CCD linear sensor 100 comprising a focal plane array system comprised of three (3) linear imaging arrays—R linear pixel array 101, G linear pixel array 102 and B linear pixel array 103. Beneath each of linear pixel arrays 101–103 are corresponding CCD readout register arrays 104–106. Charges in the pixels (R1, R2 . . . ; G1, G2 . . . ; B1, B2 . . . ) are transferred from the linear pixel arrays 101–103 down to their corresponding readout registers when the drivers 107–109 are activated. The stored charges underneath the readout registers 104–106 are ultimately laterally shifted across through the controlling action of clocks 1 (110) and 2(111), in a known manner. Drivers 112–114 buffer the shifted pixel signals which then are available for appropriate signal processing as analog outputs Vout-R, Vout-G and Vout-B.

It is typi'cally, though not always, desirable to then convert the analog pixel outputs (Vout-R, Vout-G and Vout-B) into digital bit values. Until now, a preferred way to do this involves multiplexing the analog signals such that each is sequentially (e.g., Vout-R first, followed by Vout-G, and then Vout-B) processed by a "single"Analog-to-Digital Converter (ADC) circuit (not shown). Another method might involve using three separate ADCs to digitize each of the three (R,G,B) streams of analog output signals in parallel. This latter method, however, is less desirable from a system level perspective as it requires additional components. Accordingly, many end-user linear sensor applications have been designed to process a single digital stream of multiplexed R,G,B pixel values. Even in purely analog signal processing environments, however, end-users might prefer to employ a multiplexed (non-parallel) scheme.

FIG. 2 shows the conventional color linear CCD sensor 100 coupled to an off-chip multiplexer circuit 200 provided with off-chip correlated double (CDS) sampling. The Vout-R, Vout-G and Vout-B analog outputs from the CCD linear sensor 100 are connected to respective CDS modules 201, 202, 203. After correlated double sampling is done on the signals, the signals are sequentially selected by multiplexer 204. The output of multiplexer 104 is buffered by a unity gain amplifier 205 and sent off-chip as a serial analog stream of data.

As mentioned earlier, there are many advantages to integrating additional circuit functionality into a single-chip linear image sensor. Such functionality could include the correlated double sampling and multiplexer module functionality of multiplexer circuit 200. CMOS active pixel technology makes this more readily possible.

Thus, in providing an active pixel color linear sensor, it would be advantageous to be able to include the necessary multiplexing functionality on-chip so that a system level designer can provide a solution requiring less hardware and yet still realize the traditional functionality of CCD image sensors. Intuitively, one way of implementing a single stream output in an active pixel linear sensor is to multiplex the three signal outputs on-chip such that R pixel 1 is serially output off-chip first, followed by G pixel 1 and then B pixel 1. The sequence would follow such that R pixel 2 is next, then G pixel 2, B pixel 2 and so on. For purposes of this application, such readout method shall be termed the "pixel-packed" pixel readout mode.

While the parallel packed and pixel-packed methods of readout are useful to some system level designers of imaging equipment or the like, it could be desirable to have all the stored R pixel charges read out first, followed by the G pixels and then the B pixels. For purposes of this application, this latter readout method shall be termed the "line-packed" pixel readout mode.

At the present, there is no single chip solution that provides off-chip serial stream of pixel data in line-packed form. The most direct approach to reading out the signals in the line-packed readout mode is to have the decoding of the readout registers be such that all the R signals are selected sequentially first followed by all the G pixels and finally by all the B pixels. For linear CCD sensors, this would be highly undesirable and not practicable because an inordinate amount of extra 'on-chip' and 'off-chip' control would be required. The method to sample the pixel signals and to read them out, in the three readout methods mentioned (parallel-packed, pixel-packed and line-packed pixel readout modes), and at high speed, has given rise to a need for a more versatile, preferably "single-chip" solution operable in at least line-packed mode, but preferably in all three modes.

However, as has been generally explained above, attempting to include functionality to implement all three readout modes on the same silicon as a CCD imager is highly undesirable due to the power dissipation considerations, and likely impracticable due to the incompatibility of CCD technology with CMOS circuitry.

While system level (off-chip) solutions are possible, the complexity of implementing line-packed readout circuitry makes such an implementation very costly and therefore impractical, though otherwise desirable from an implementation standpoint for some system level imaging applications.

Furthermore, even if it were possible to include linepacked readout on-chip on a linear image sensor, there are practical problems with doing so using conventional means. Pixels of the same color along a linear pixel array are presently all stored in an associated readout register array. Even if appropriate timing and control logic is added to cause the contents of, for example, readout register array 104 (red pixels) of CCD image sensor 100 to be read out first, followed by all the contents of readout register array 105 (green pixels), followed by all the blue pixels, three separate controls would be needed to decode when to select which register. At the present, the CCD parallel-packed readout implementation employs simple decoding that ripples through all three readout registers, column by column, in parallel fashion and does not therefore address this problem. Providing serial selection of same color pixels stored associated with a same addressable row, would necessarily require a subsequent pixel to be readout after the readout interval of the preceding presently being read out pixel has lapsed. In such a solution, the effective pixel rate—be it implemented in CCD or CMOS active pixel sensor technology—would be three times slower than the effective pixel rate of normal parallel-packed readout;—even though the pixel rate per output channel remains the same.

In quantitative terms, assuming a pixel rate of 4 MHZ per line, in a parallel-packed configuration (three output channels) the parallel RGB readout would have an effective pixel rate of 12 MHZ. However, in the line-packed (single channel) configuration, the effective pixel rate is still only 4 MHZ.

SUMMARY

The present invention aims to provide a CMOS active pixel color linear image sensor which is operable in line-packed readout mode, and at very high speed. In accordance with a preferred embodiment, the sensor is formed entirely on a single-chip and may be further configurable for operation in parallel-packed and/or pixel-packed modes. Line-packed pixel readout is accomplished by spreading same color pixel signal sampled values in storage elements across each of plural readout register arrays in a "cyclic" manner. Facility is introduced for starting the reading of a next pixel (e.g., R pixel 2) even before the previous pixel (R pixel 1) has been read out to increase the effective pixel readout rate.

DESCRIPTION OF THE PREFERRED EMBODIMENTS

A single-chip CMOS active pixel color linear sensor is herewith described with reference to FIGS. 3–16.

Figure 1:
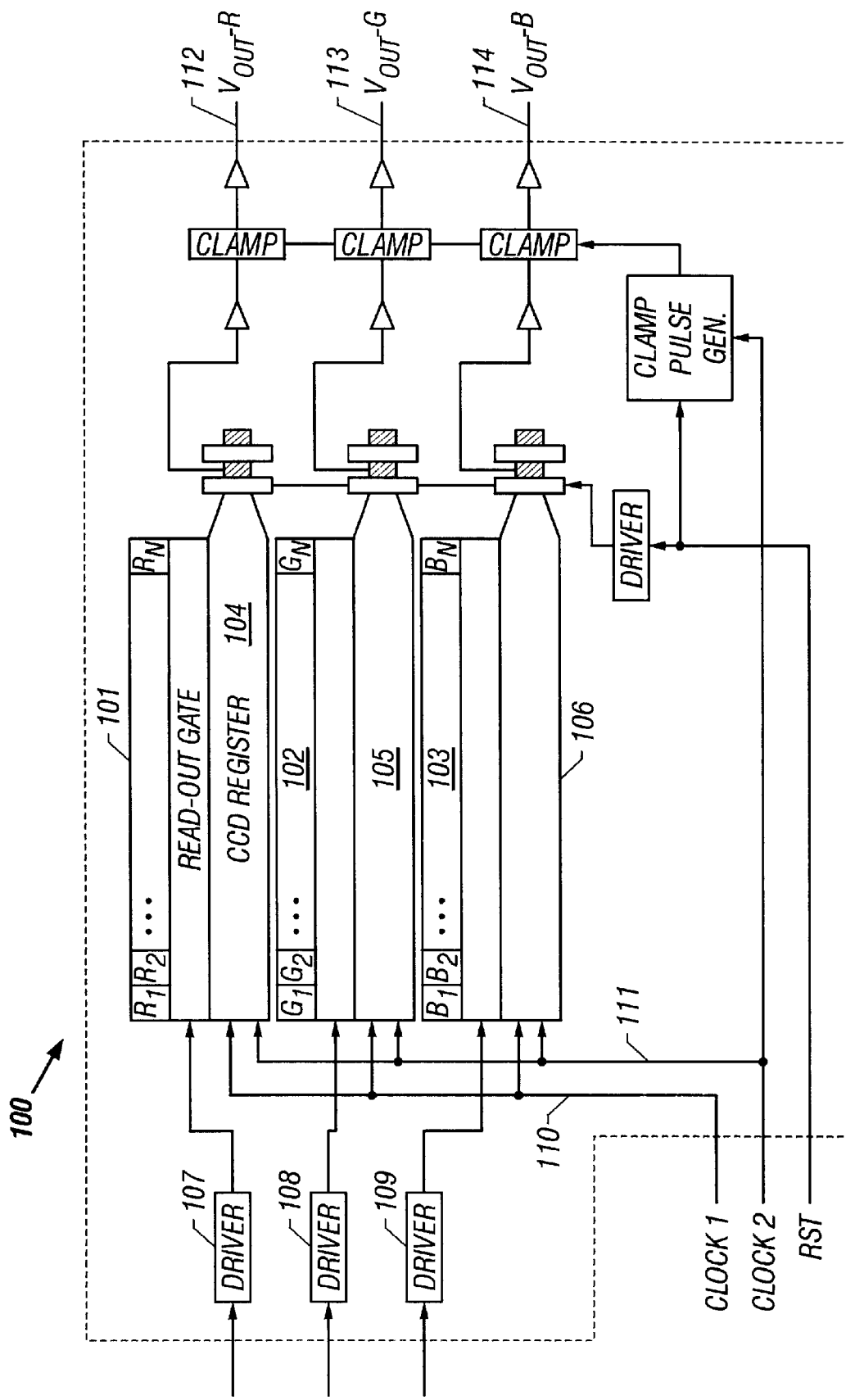
FIG. 1 shows a block diagram of a conventional color linear CCD sensor operating in parallel-packed pixel readout mode.
Figure 2:
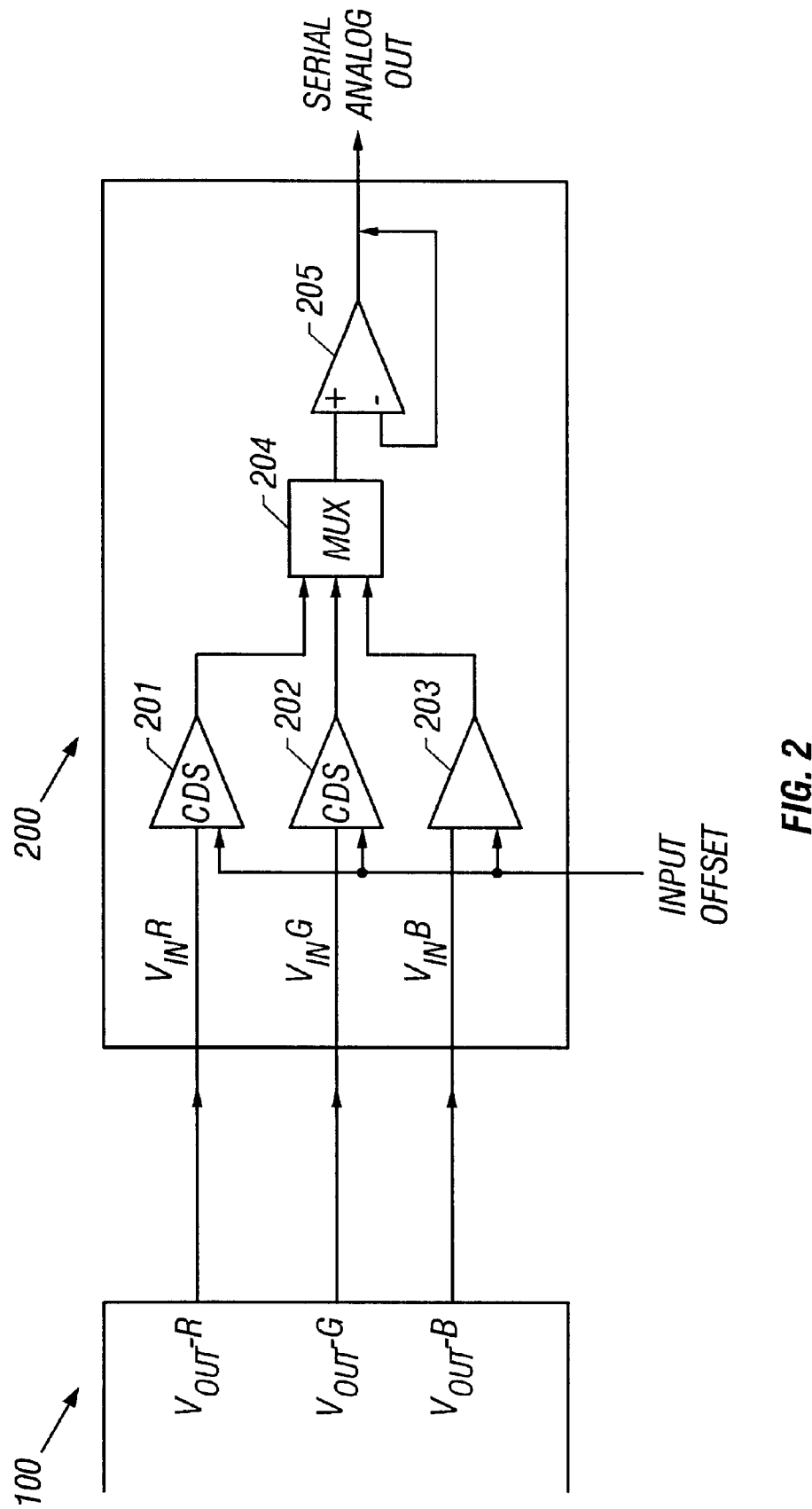
FIG. 2 shows a block diagram of the color linear CCD sensor of FIG. 1 coupled to a conventional multiplexer circuit for simulating pixel-packed pixel readout mode.
Figure 3:
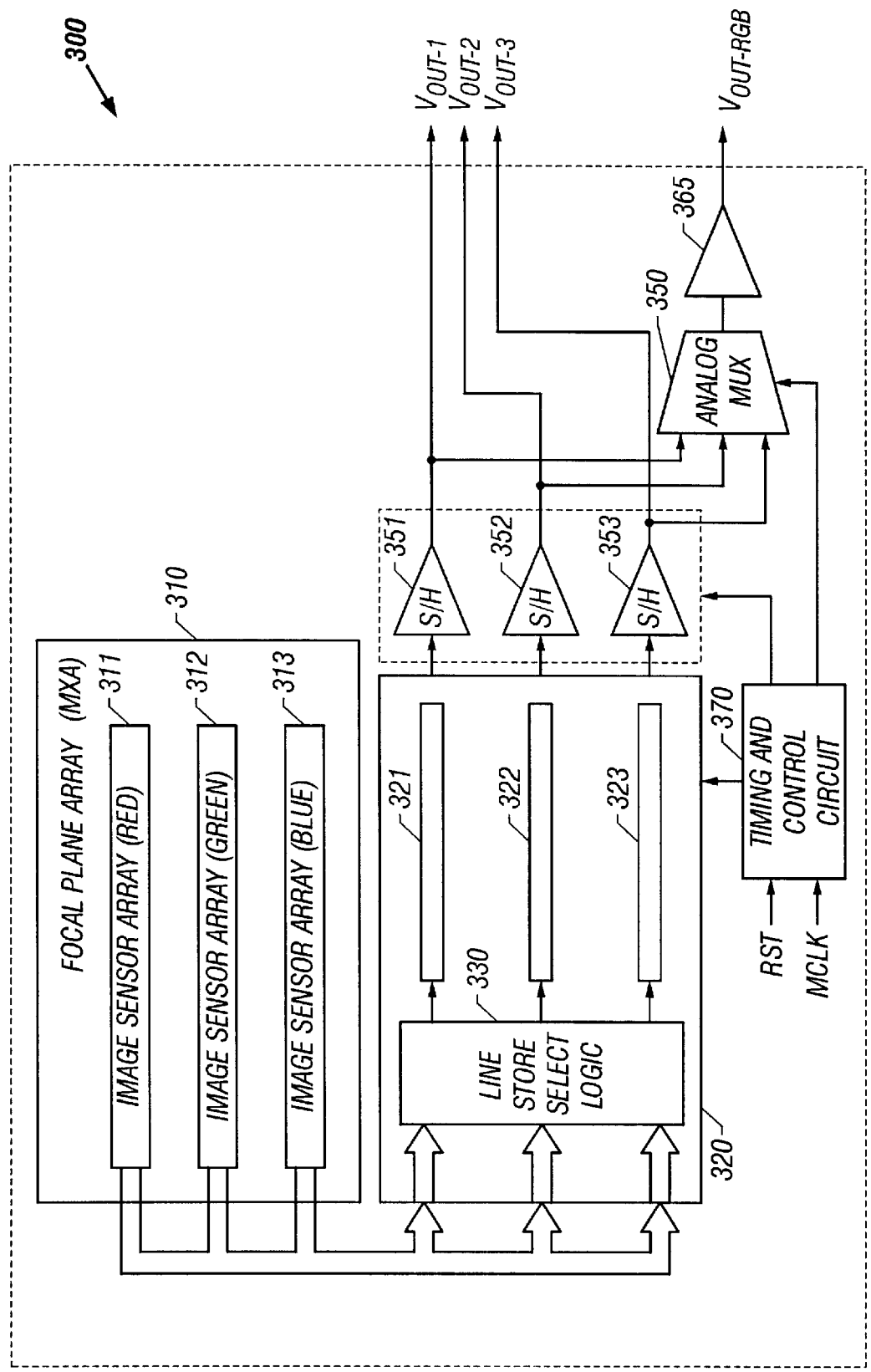
FIG. 3 is a block diagram illustrating the architecture of a color CMOS active pixel linear sensor in accordance with the present invention.

FIG. 3 shows a block diagram of a CMOS active pixel linear image sensor 300 in accordance with an embodiment. Sensor 300 includes focal plane array 310 having three linear arrays 311–313 of red (R), green (G) and blue (B) color pixels, respectively, together defining (m×n) color pixels, shown in greater detail below. Line control/readout logic circuit 320 includes first, second and third readout register arrays 321, 322, 323 coupled to linear arrays 311–313 by way of line store select logic 330. Readout register arrays cooperatively define an array of (m×n) storage elements for storing sampled outputs of selected ones of said (m×n) pixels. As will be explained below in greater detail, during line-packed pixel readout mode, each of the pixels in each of the linear arrays 311–313 are stored in a cyclic manner across the first, second and third readout register arrays 321–323, each of which is a two-row linear array of equal column length (m) to that of linear arrays 311–313.

Figure 4:
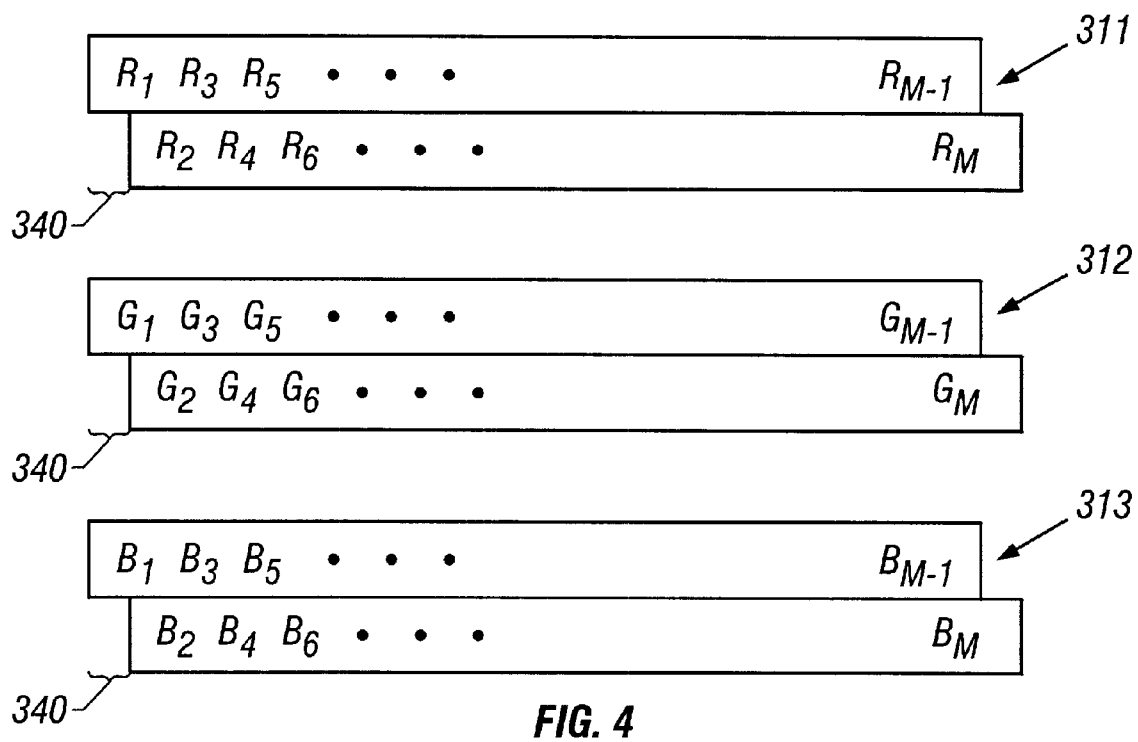
FIG. 4 shows a high level representation of the red, green and blue linear arrays of the active pixel sensor of FIG. 3.

In the illustrative embodiment, each linear array 311–313 of red (R1, R2, R3 . . . Rm), green (G1, G2, G3 . . . Gm) and blue (B1, B2, B3 . . . Bm) color pixels is a two-dimensional two-row by (m) column array having odd and even sets of (m/2) pixels on parallel rows and offset by half a pixel pitch 340 in the column direction, as shown in FIG. 4.

Line store select logic 330 contains combinatorial and other appropriate hard-wired logic (described in greater detail below), including corresponding column logic, correlated double sampling (CDS) logic, and output buffers, for sampling and storing pixel values in each of the three (two-row; odd/even) readout register arrays 321–323. Individual pixels are stored in selected storage elements in arrays 321–323—by way of associated line store lines: line store 1 odd, line store 1 even; line store 2 odd, line store 2 even; line store 3 odd, line store 3 even—in either a non-cyclic manner (parallel-packed, pixel-packed) or cyclic manner (line-packed).

The stored pixel values in each of register arrays 321–323 are processed by the associated sample and hold circuits 351–353 before being read out off-chip (Vout-1, Vout-2, Vout-3). The outputs of the sample and hold circuits are also directed to the analog multiplexer circuit 360 for serial readout (Vout-RGB). The output signal from the multiplexer circuit 360 is passed through a unity gain amplifier 365 before being directed off-chip. The chip also contains a timing and control circuit 370 for generating the necessary additional control and timing signals. Such signals include appropriate column readout control logic signals, DTS (sample and hold) control, and multiplexing logic, generally explained in greater detail below in connection with the detailed operational description of the active pixel color image sensor illustrated in FIG. 14.

Figure 5:
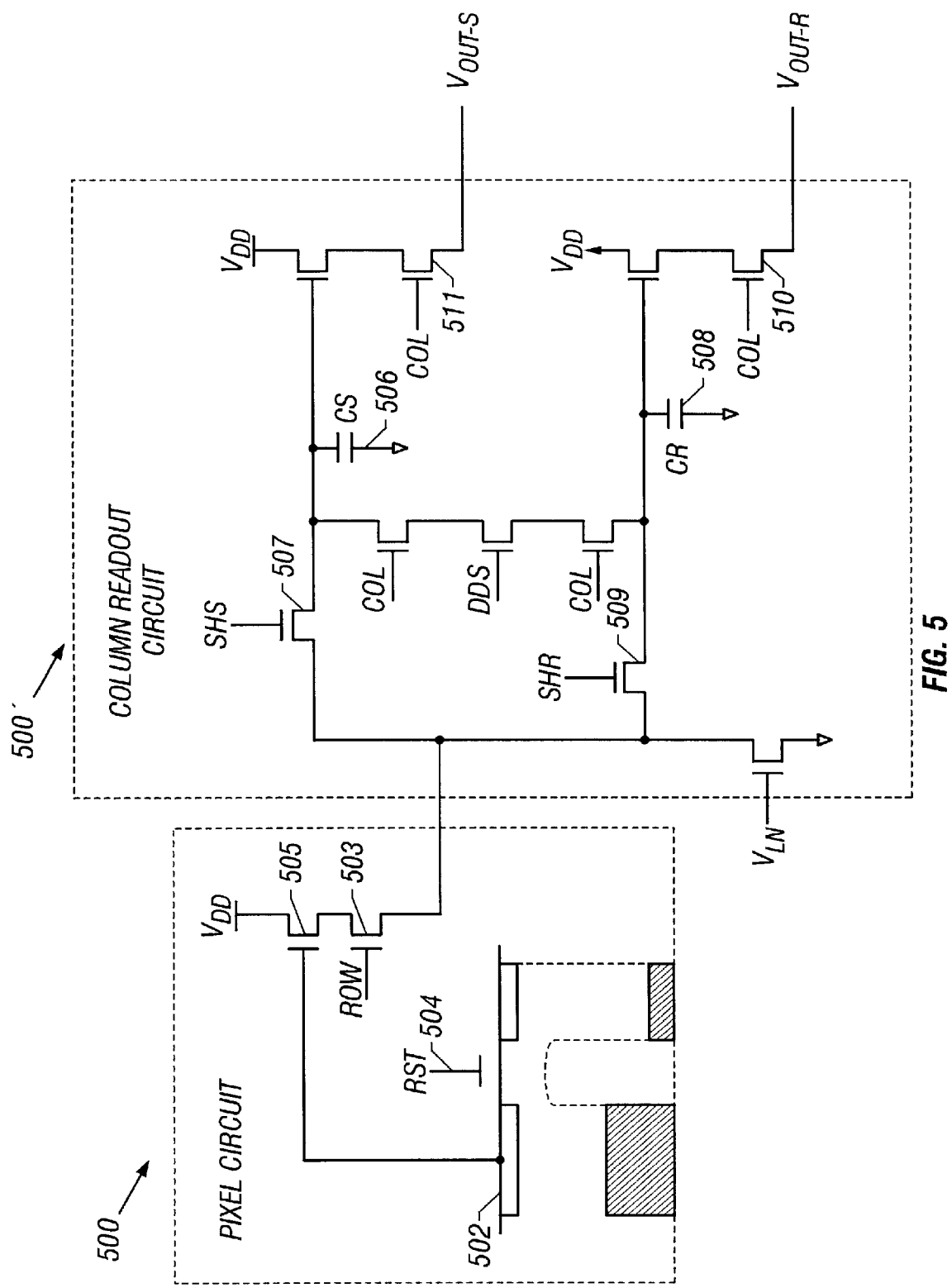
FIG. 5 is a schematic diagram illustrating the architecture of an individual pixel element, a column readout circuit thereof including outputs to be sampled and stored in addressable storage elements in accordance with the present invention.

A schematic diagram of the architecture of an individual pixel element as might be constituted by any of the (m×n) pixels in focal plane array 310, will now be described with reference to FIG. 5. Each pixel or pixel element is generally comprised of two parts, a CMOS active pixel circuit 500 and a column readout circuit 500'. Incident photons on the pixel area generate electrons that are collected in a PD area 502. When a number of pixel circuits 500 are arranged horizontally, they constitute a row of pixels. By enabling row selection transistor 503 the row is selected for readout.

In the illustrative implementation, a floating diffusion (PD) 502 is first reset. This is achieved by pulsing the gate of reset transistor 504 to a high voltage, for example VDD. After a period of time, the voltage of the floating diffusion 502 drops to reflect the number of electrons accumulated in the PD area 502. The voltage of the floating diffusion is then read out from the pixel circuit 500 onto the column bus circuit 500' using source follower 505 located within the pixel circuit. The voltage on the column bus circuit 500' is then sampled onto a first storage capacitor CS 506 by enabling the sample-hold signal (SHS) transistor 507.

Figure 6:
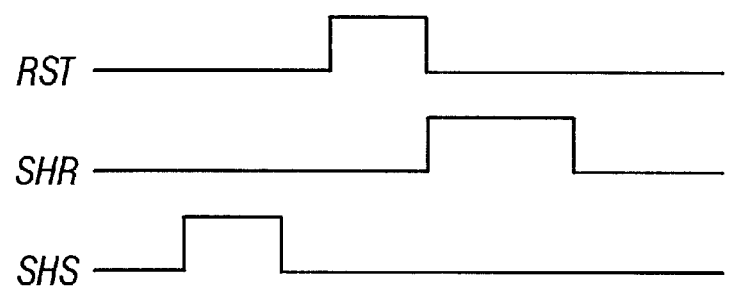
FIG. 6 shows the readout timing for the individual pixel element shown in FIG. 5.

After the signal charge is read out, the pixel is then reset. The gate of the reset transistor 504 is pulsed to a high voltage again. The resultant voltage of the floating diffusion 502 is then read out onto the column bus circuit using the same source follower 505 as before. This time the voltage is sampled onto the other storage capacitor CR 508 by enabling the sample-hold reset (SHR) transistor 509. FIG. 6 shows the basic readout timing for the pixel element shown in FIG. 5. The voltage difference between the voltages stored in the two capacitors, CS 506 and CR 508 is indicative of the charges collected in the floating diffusion area 502.

In a conventional CMOS active pixel sensor, all the pixels in the same row are processed simultaneously. The signals are sampled onto storage elements or storage capacitors in respective column circuits located beneath the linear imaging arrays. After the row sampling process, the signal in each column is read out successively by enabling the n-channel column selection transistors 510, 511. A more detailed discussion of an active pixel sensor sampling and readout operation, including the more specific correlated double sampling (CDS) processing, is provided in the above-mentioned U.S. Pat. No. 5,841,126, which has been incorporated herein by reference, and is cited herein only as background.

Figures 7, 8:
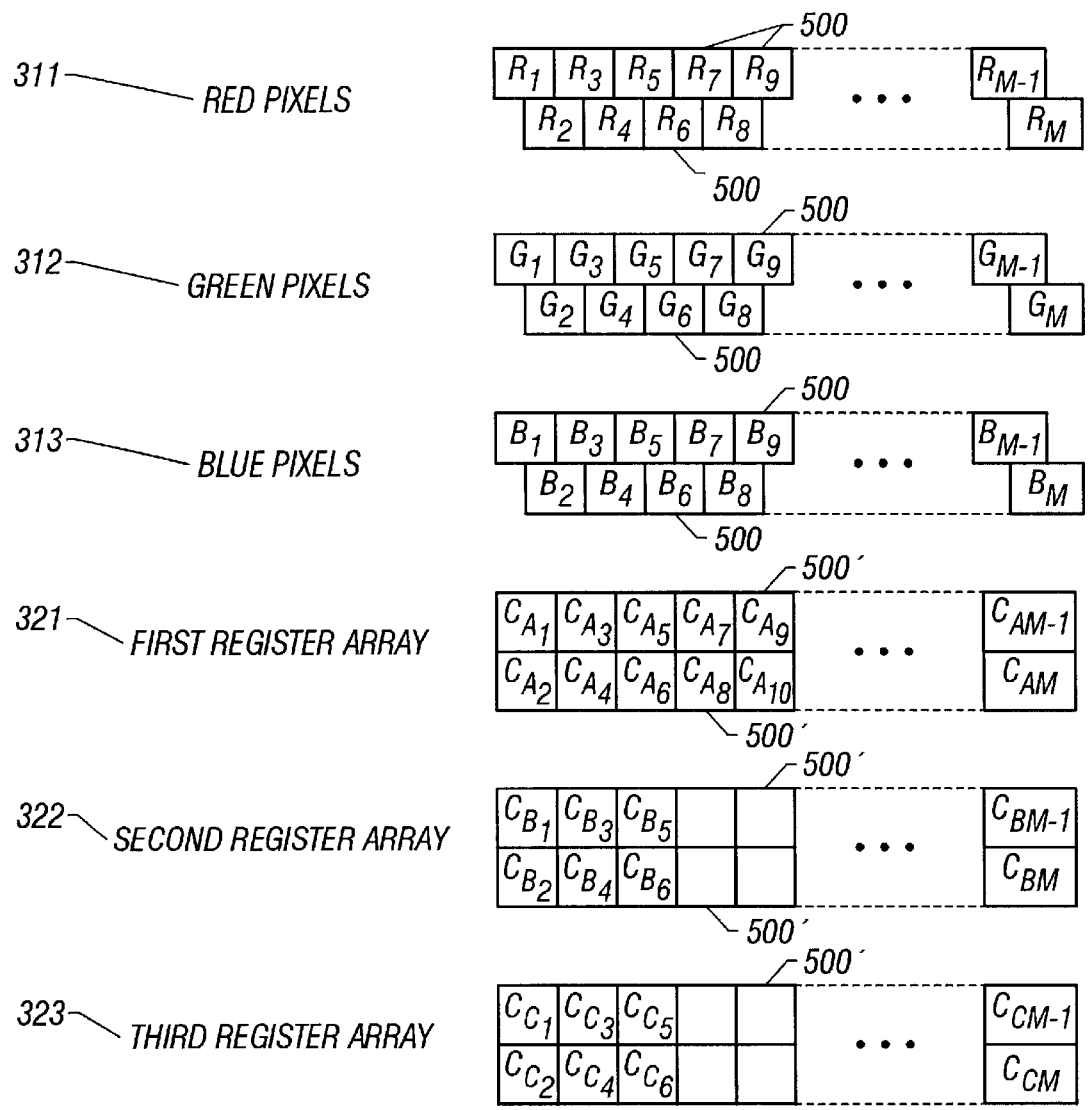
FIG. 7 shows a high level logical representation of the beginning portions of the three two-row linear arrays (red, green and blue pixels) and of the two-row readout register arrays, constituted by linear arrays of storage elements, and disposed beneath the linear arrays for storing therein in a predetermined manner selected ones of said pixel values.
FIG. 8 shows, in expanded form, the predetermined non-cyclic manner in which red, green and blue pixels are sampled and stored, in parallel-packed and pixel-packed readout modes, in storage elements in the three readout register arrays in accordance with the present invention.

FIG. 7 shows a high level logical representation of the beginning portions of the three two-row linear arrays (red, green and blue pixels) 311–313 and of the two-row readout register arrays 321–323, constituted by linear arrays of individual storage elements, and disposed beneath the linear arrays for storing therein in a predetermined manner selected ones of said pixel values.

In the illustrative implementation described above, there are six rows altogether (n=6): one row of odd (red) pixel circuits [R1,R3,R5 . . . Rm−1]; one row of even (red) pixel circuits [R2,R4,R6 . . . Rm]; one row of odd (green) pixel circuits [G1,G3,G5 . . . Gm−1]; one row of even (green) pixel circuits [G2,G4,G6 . . . Gm]; one row of odd (blue) pixel circuits [B1,B3,B5 . . . Bm−1]; one row of even (blue) pixel circuits [B2,B4,B6 . . . Bm]. Collectively, the three two-dimensional linear arrays of (m×n) pixel circuits of red, green and blue pixels (311–313) may be mapped to column circuits 500' which collectively define the three readout register arrays 321–323 and which may be formed located beneath linear arrays 311–313. Each register array 321–323 is constituted therefore by a twodimensional two-row array of corresponding column circuits 500' (hereafter referred to individually as "storage elements").

Referring back to FIG. 7, each cube in the red, green and blue linear pixel arrays 311–313 represents an active pixel circuit 500. Similarly, each cube in readout register arrays 321–323 represents an equivalent circuit as that represented by column circuit 500' in FIG. 5. Each line of column circuit 500' cubes is physically stacked beneath the linear imaging arrays 311–313 as depicted.

In the present implementation to be described below, the chip-architecture affords three different modes of readout: parallel-packed, pixel-packed and line-packed. In parallel-packed and pixel-packed modes, it is desired that two-row readout register array 321 shall store all the red pixel values as shown in FIG. 8, with odd red pixel values being stored on top of even pixel values. Similarly, register array 322 shall store all the green pixel values in two-row mapped format, and register array 323 shall store all the blue pixel values. This storing arrangement shall afford the best and fastest readout of pixel values in either parallel- or pixel-packed selected mode.

Figure 9:
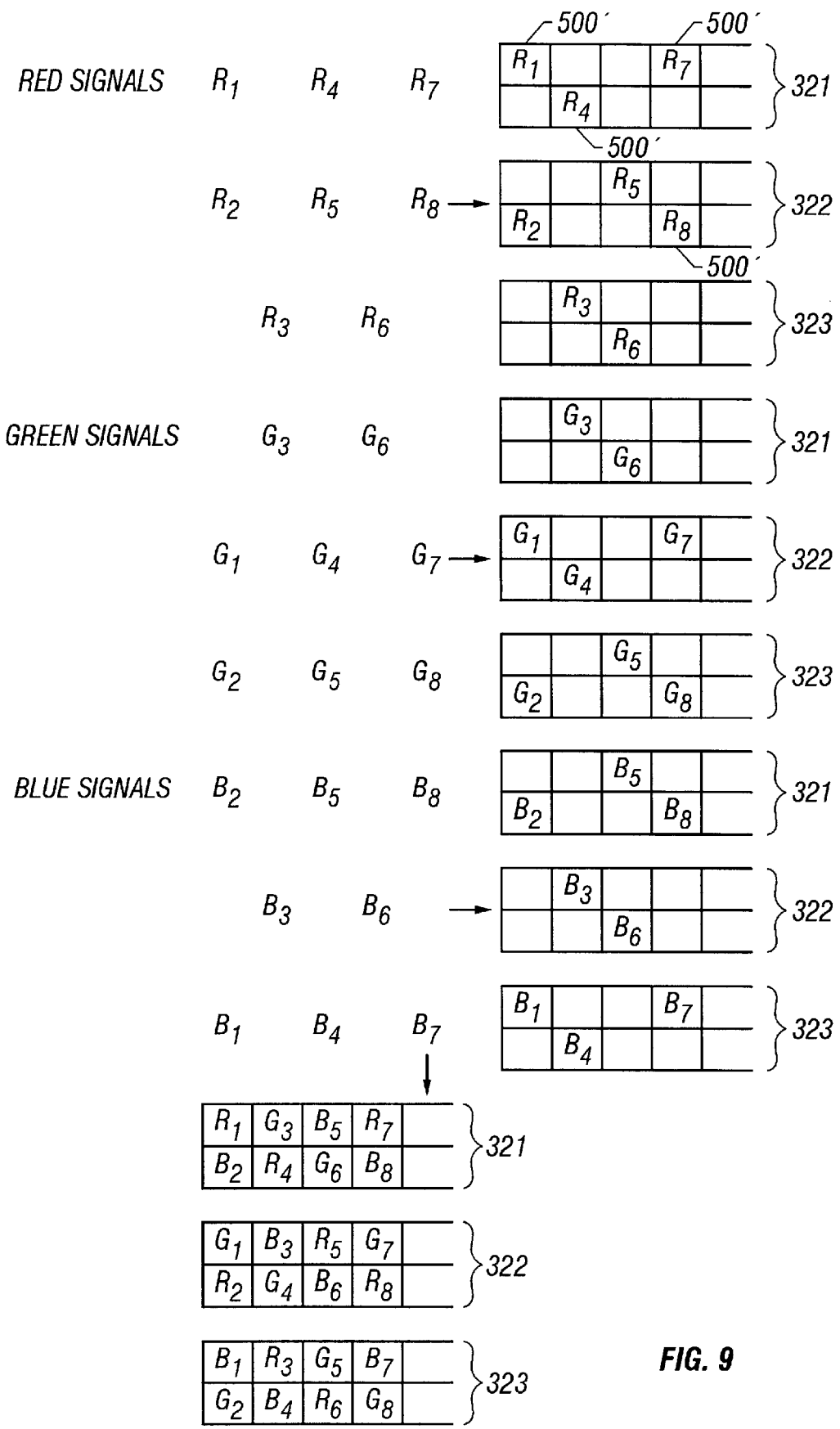
FIG. 9 shows, in expanded form, the predetermined cyclic manner in which red, green and blue pixels are sampled and stored, in line-packed pixel readout mode, in storage elements in the three readout register arrays in accordance with the present invention.

The storage of pixel values in line-packed readout mode is different from that of parallel- or pixel-packed modes and is best explained with reference to FIG. 9. As can be seen, in this mode, first all the red pixel circuits are sampled and their values stored onto a pre-assigned storage element; followed by all the green pixel circuits; and then all the blue. In this regard, the pixel values are stored in the register arrays 321–323 in the same order as they shall be read off-chip. What is different, however, is that while pixel values, e.g., R1, R2, R3, etc., are read out in serial order, such values are not stored (mapped) to the same corresponding readout register array. Instead, consecutively numbered same-color pixel values are stored in disjoint locations across the three lines of readout register arrays 321–323, and not necessarily on the corresponding even or odd location with a particular register array to which a pixel shall become mapped.

Figure 10:
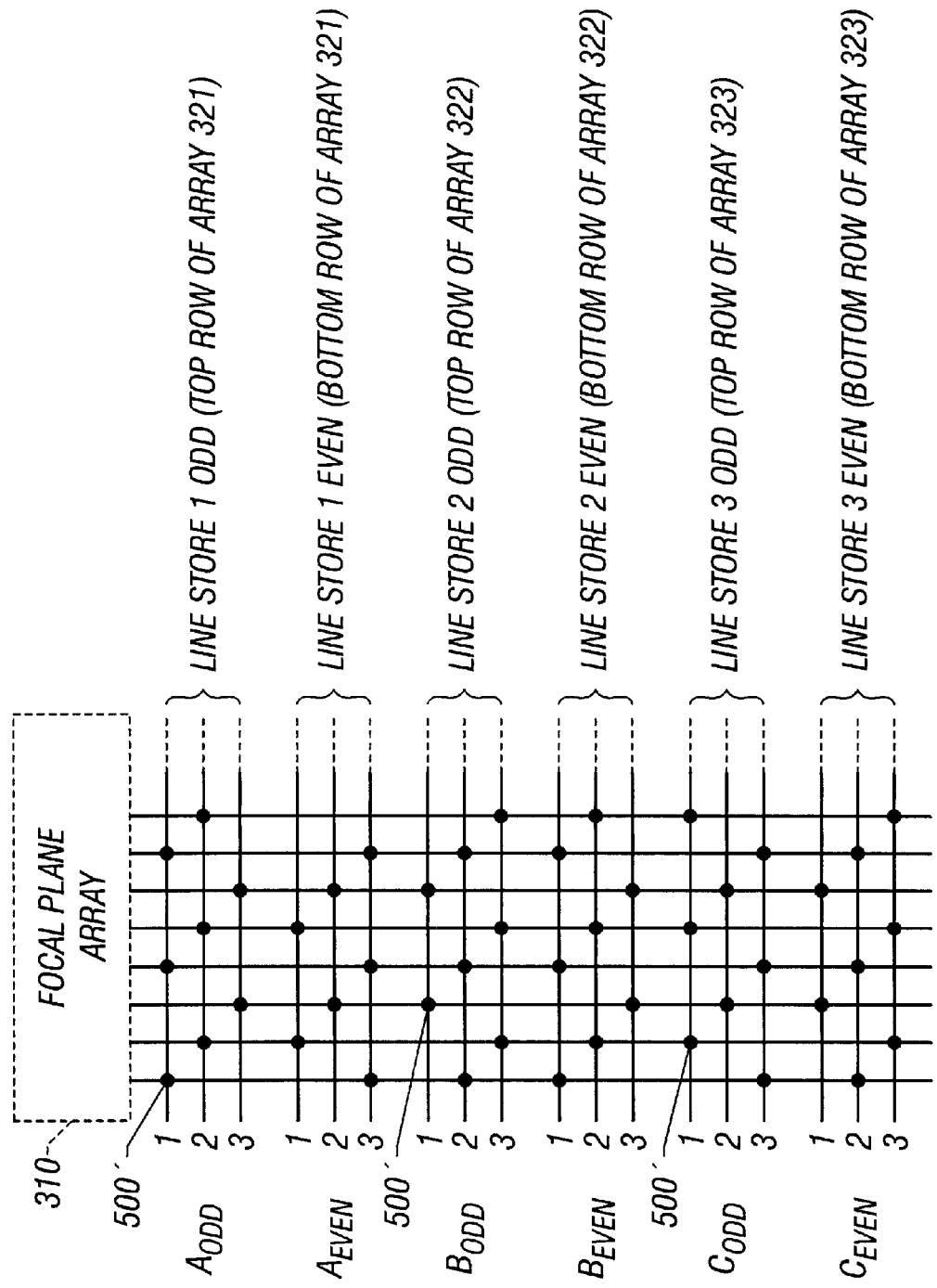
FIG. 10 is a high level switching diagram of the hard-wired logic and associated additional control lines for implementing each of parallel-, pixel- and line-packed readout of pixels to storage elements in the three linear readout register arrays in accordance with the present invention.
Figure 11:
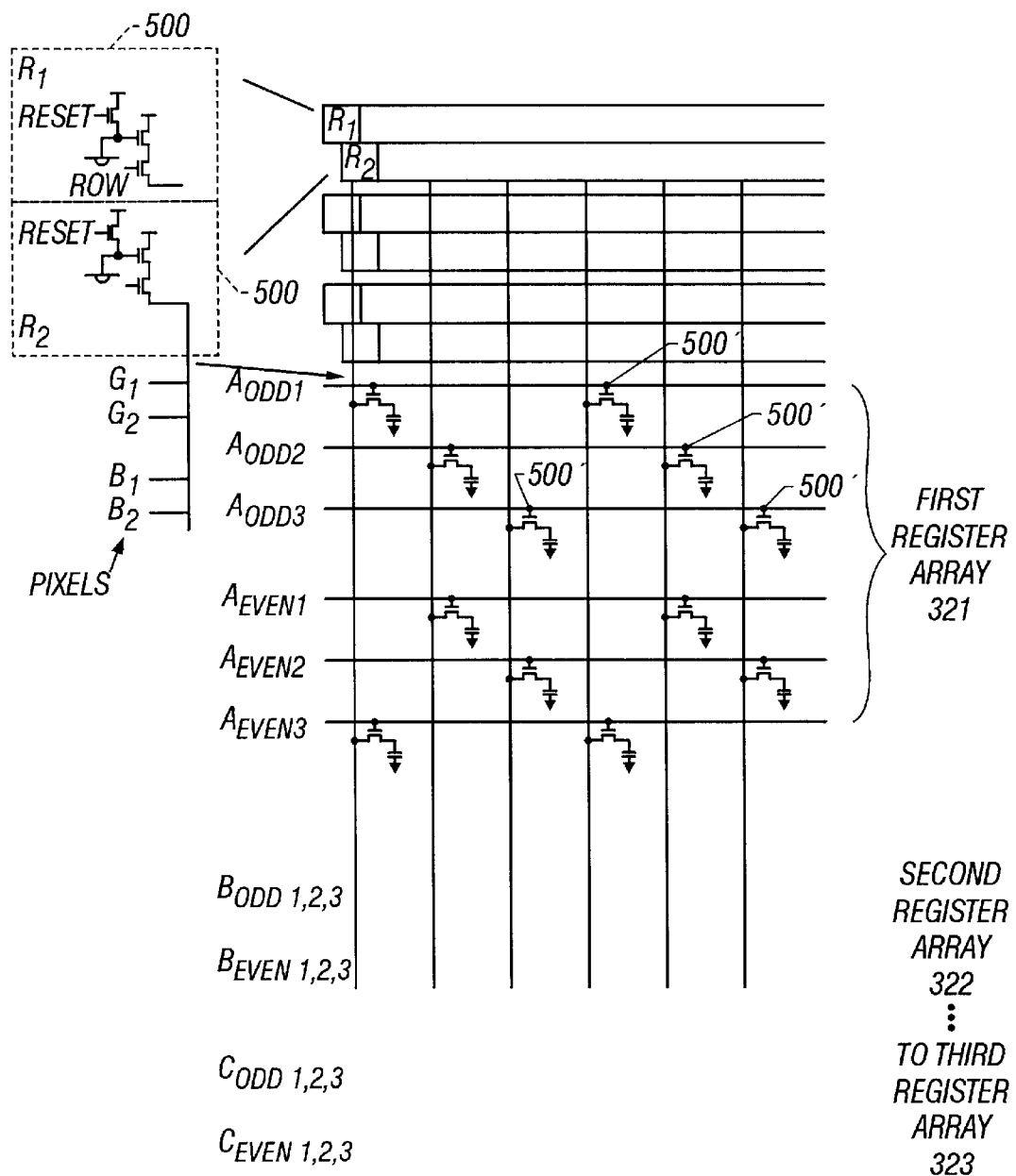
FIG. 11 is a lower level depiction of the hard-wired logic diagram and control lines in FIG. 10.

To achieve the selection of storage elements for storing the pixels in the desired manner, an appropriate combination of hard-wired logic and simple combinatorial logic is envisioned. FIGS. 10 and 11 show the addition of additional control lines for enabling sampling switches representative of SHS/SHR column addressing logic. Each dot 500' in FIG. 10 represents sampling switches which contain the sampling transistors 507, 509 as well as column storage capacitors (CS, CR) 506, 508. As is apparent, instead of the two (2) control lines (SHS, SHR) necessary in parallel-packed or pixel-packed modes (where each pixel circuit is pre-mapped to its associated same column/even (odd) row of the corresponding readout register array), there are now 12 control lines provided for each pixel storage element assignment (6 for the odd, 6 for the even). It should be appreciated that the order of assignments is cyclic in manner corresponding to the desired alternating pattern for storing consecutive same-color pixel values for efficient parallel readout from the three two-row readout register arrays 321–323.

Figure 12:
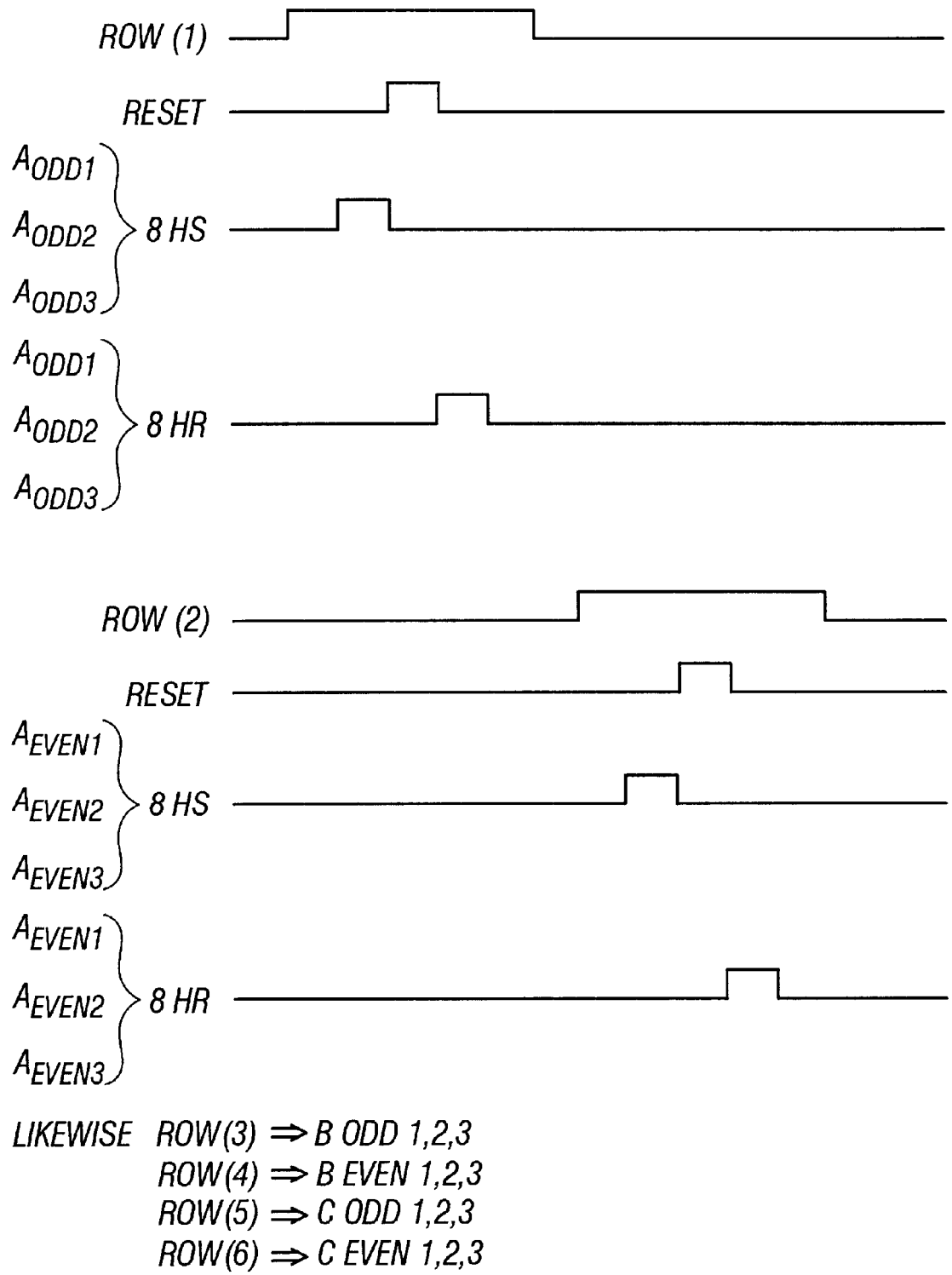
FIG. 12 is a timing diagram depicting control line and row sampling methodology for storing pixels in parallel/pixel-packed readout modes in accordance with the present invention.
Figure 13:
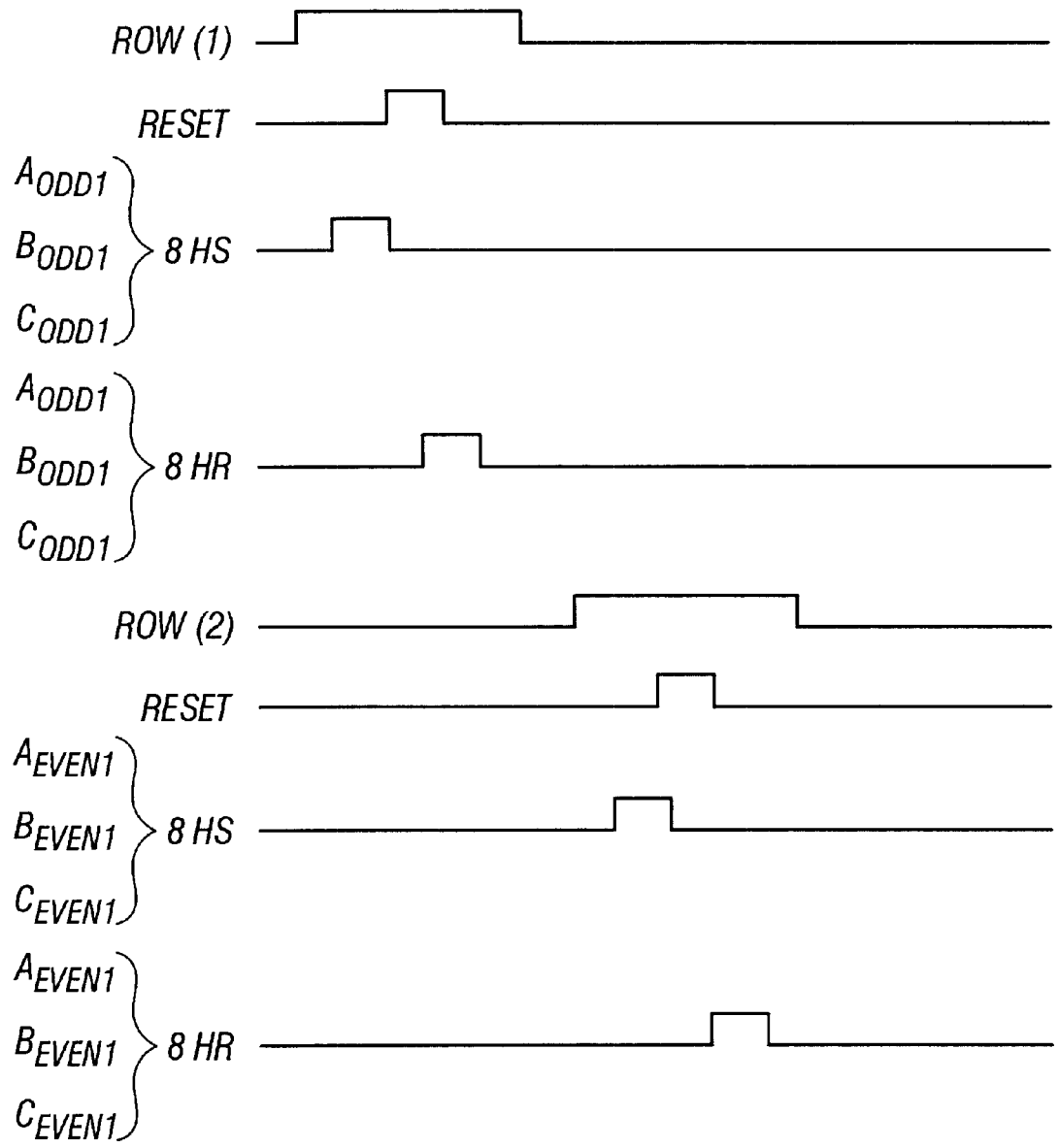
FIG. 13 is a timing diagram depicting control line and row sampling methodology for storing pixels in line-packed readout modes in accordance with the present invention.

FIG. 12 is a timing diagram depicting control line and row sampling methodology for storing pixels in parallel-/pixel-packed readout modes in accordance with the present invention. FIG. 13 is a timing diagram depicting control line and row sampling methodology for storing pixels in linepacked readout modes in accordance with the present invention.

When in parallel- or pixel-packed readout mode, all top row red pixels [R1, R3, etc] are sampled/stored in corresponding storage elements in the top row of first readout register array 321; all bottom row [R2, R4, etc.] red pixels in the bottom row; and so on, until all the pixel charges are captured. For this purpose, the SHS and SHR transistors coupled to control lines Aodd1, Aodd2 and Aodd3 are to be enabled appropriately when sampling the pixel signals from Row 1 (odd R pixels). Because pixel signals in Row 2 are that of even R pixels, the SHS and SHR transistors controlled by Aeven1, Aeven2 and Aeven3 are to be enabled when sampling the pixel signals from Row 2.

Figure 14:
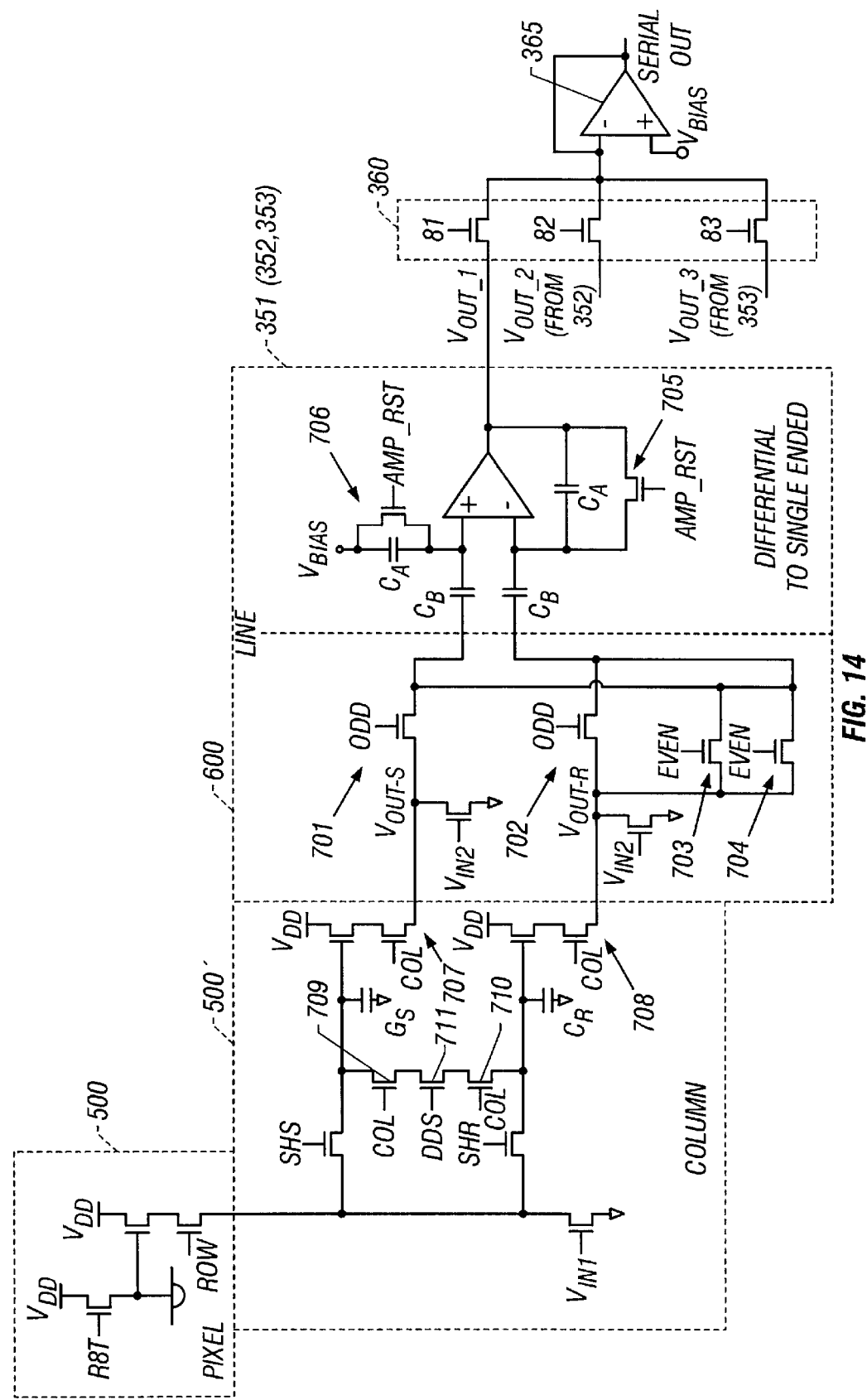
FIG. 14 is a more detailed schematic of the architecture of the active pixel element of FIG. 5, further shown is odd/even storage-element select logic, DTS (sample and hold) logic and multiplexer circuit for off-chip pixel readout in a selected readout mode.

When in line-packed mode, pixel signals are sampled into an ordered cyclic position. Accordingly, different storage element sampling/switching control signals are generated than in either the parallel- or pixel packed readout modes. For example, to sample odd R pixels into the preselected cyclic positions identified in FIGS. 10 and 11, control lines Aodd1, Bodd1 and Codd1 (constituted by corresponding SHS/SHR timing) need enabling during pixel sampling and readout. In the case of even R pixels, control lines Aeven1, Beven1 and Ceven1 need enabling. FIG. 14 is a more detailed schematic of the architecture of the active pixel element circuitry in FIG. 5. In accordance with a preferred embodiment, pixel circuit 500 and column readout circuit 500' comprising each active pixel element are further coupled to an odd/even storage-element select circuit 600, which in turn feeds a corresponding one of differential-to-single ended (DTS) circuits 351, 352, 353, corresponding to sample and hold circuits 351, 352, 353) in FIG. 3. After correlated double sampling is performed on the pixel signals (by enabling of DDS switch 711), the differential signals Vout_S and Vout_R are converted to a single ended signal by DTS circuit 351. Because there is only one DTS circuit 351 (352, 353) for each readout register array 321—323, switches 701—704 are added to select between odd and even storage elements.

The operation of DTS circuit 351(352, 353) is as follows. First the DTS is reset to a bias level by turning on reset switches (amp_rst) 705, 706. Contemporaneously, the desired column is selected by enabling corresponding column selection transistors 707, 708. When reset switches 705, 706 are turned off, DDS switch 711 is turned on. Because switches 709, 710 are already turned on at the time column selection transistors 707,708 are enabled, turning on DDS switch 711 will short the voltages of the two storage capacitors, CS and CR. The output of DTS circuit 351 (352, 353 will then increase by an amount in proportion to the difference in voltage between the two signals Vout_R and Vout_S. This relationship may be expressed by the following equation:

$$\text{Vout} = Cb/Ca(\text{Vout\_R} - \text{Vout\_S}) + \text{Vbias}$$

Figure 15:
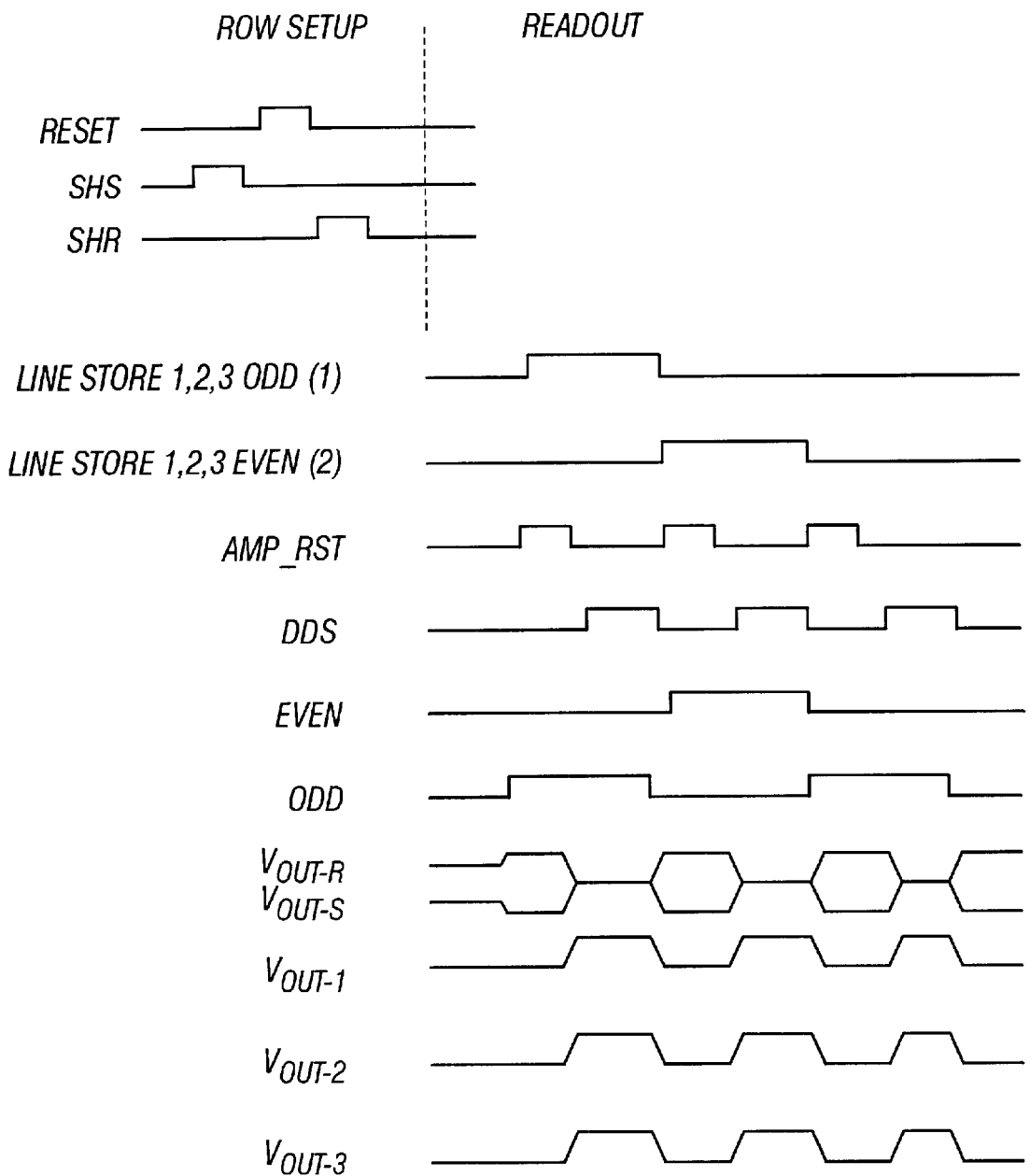
FIGS. 15 and 16 show readout timing for each of the parallel-packed and the pixel-/line-packed readout mode implementations, respectively, in an active pixel element architecture as shown in FIG. 15 in accordance with the present invention.
Figure 16:
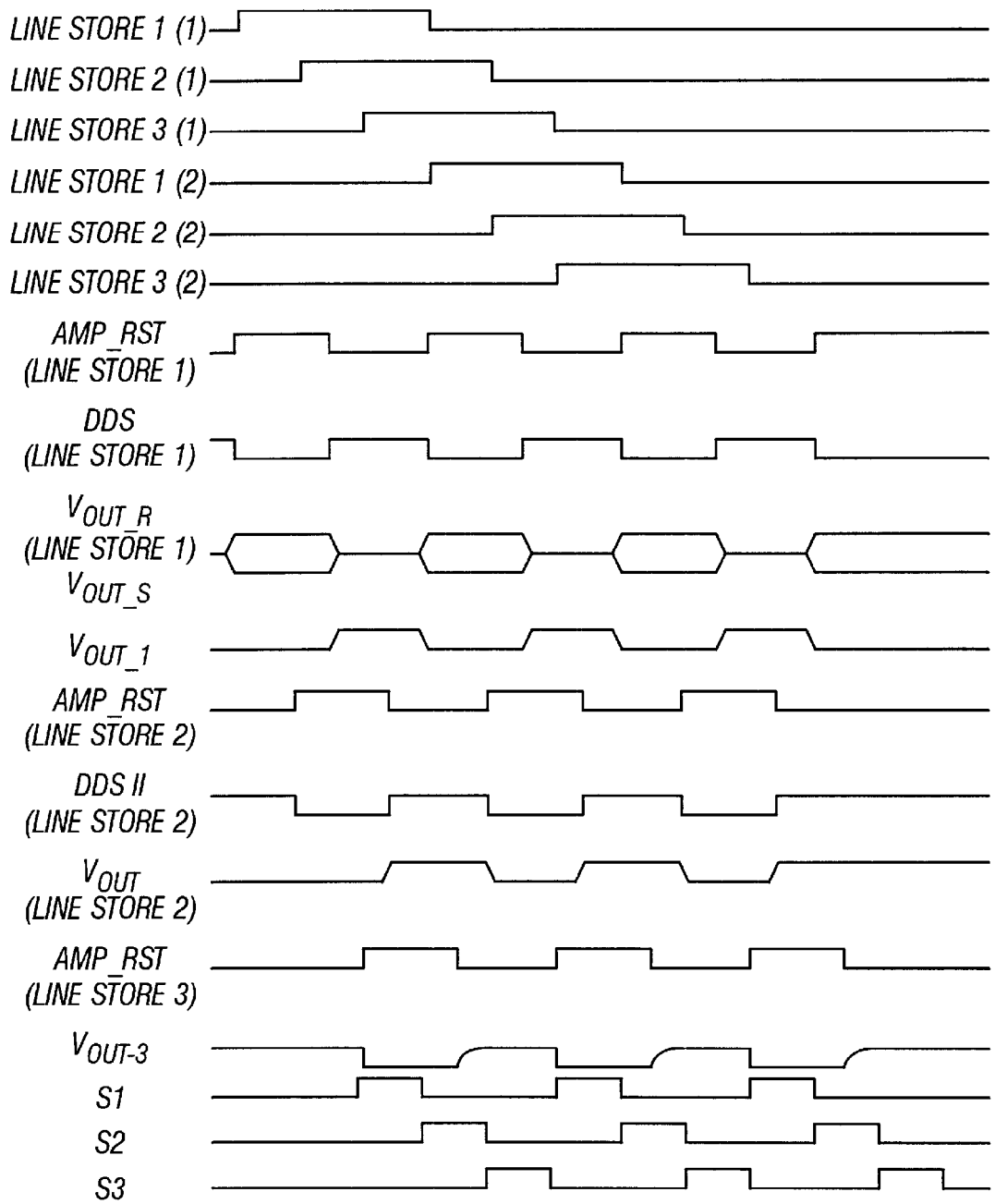

FIGS. 15 and 16 shows the readout timing for the parallel, pixel-packed and line-packed pixel readout modes in accordance with the present invention.

FIG. 15 shows the timing and control for the various pixel data signal processing events described above in connection with the active pixel sensor 100 architecture shown in FIG. 14. In the parallel-packed readout mode, column select logic for the three register arrays 321–323 are the same value, i.e. column 1 for each register array is selected at the same time as that of the other arrays, followed by column 2 and so on. For the pixel-packed and line-packed readout modes, the selection of a column readout circuits 500' is delayed by a third of the column selection time of that of a different storage array. As depicted in FIG. 16, the selection of column 1 of line store 2 (Line Store 1 (1)) is delayed a third of the column selection time of that of line store 1 (Line Store 1 (1)). In the same manner, the selection of columns for line store 3 is delayed by a third of the column selection time from that of line store 2. This means that the pixel signal from line store 2 (Vout_2) will be available after a third of the column selection time has elapsed since the pixel signal from line store 1 is available (Vout_1); similarly, for line store 3 (Vout_3) relative to line store 2 (Vout_2).

Also depicted in FIG. 16 is the timing control of analog multiplexer circuit 360. During readout, transistor s1 is turned on first to select the signal from line store 1 (Vout_1), followed serially by the signal of line store 2 (Vout_2) and finally by the signal of line store 3 (Vout_3). This methodology results in a serial output pixel signal rate which is three times the effective single channel rate. It should be appreciated therefore that using a 3-to-1 multiplexer circuit (360) to select the signals at an appropriate (early) time interval increases the effective pixel rate by threefold relative to a purely start-to-finish sequential read.

It should be appreciated that the present embodiment offers a system designer employing imaging sensors broader functionality that previously available with parallel-packed only single-chip CCD linear sensors. More particularly, a single-chip solution is provided which includes the additional pixel readout modes of line-packed and pixel-packed analog data streams. Because of the cyclic nature and different register array positioning of pixels in storage elements, the solution provides the further benefit of high speed serial pixel readout efficiency.

In addition, because the entire solution employs CMOS technology, integration with other components and on-chip customization is made more flexible.

It should be appreciated that while the present embodiment was described with a floating diffusion type active pixel circuit, a floating gate or the like equivalent photoimaging device may be employed instead.

Furthermore, the active pixel color linear sensor of the present invention is preferably fabricated using standard CMOS process, so that all of the dopant concentrations of the n-channel and p-channel devices and of the various diffusions are in accordance with such a process.

In addition, while a two-dimensional (two-row) active pixel linear array is shown and described, a one-dimensional array of the same color pixels may be contemplated.

Also, while normally linear image sensors comprise the three primary colors, i.e., red, green and blue pixel arrays, the invention is not limited to those colors or color combinations. Other colors and color combinations such as cyan, magenta and yellow, etc. may instead be envisioned. Furthermore, while a three color sensor is disclosed, color sensors containing linear arrays of more than three colors and of any array length may be envisioned.

Although only a few embodiments have been described in detail below, those having ordinary skill in the art would certainly understand that many modifications are possible in the preferred embodiment without departing from the teachings thereof.

All such modifications are intended to be encompassed by the following claims.

What is claimed is:

1. A device, comprising:
   a focal plane array of pixels, comprising an array of m x n pixels having at least first, second and third pixel groups;
   a plurality of storage elements, separate from said pixels, and enabling storage of information from said pixels into said plurality of storage elements, said plurality of storage elements including at least first, second and third groups of storage elements; and
   readout logic, which selectively operates to control sampling of different ones of said pixels to different ones of said storage elements during a line packed pixel readout mode.

2. A device as in claim 1, wherein each of said pixels is an active pixel imaging sensor.

3. A device as in claim 2, wherein said readout logic controls said sampling during said line packed pixel readout mode to cyclically store values from pixels respectively in the first, second and third groups of storage elements.

4. A device as in claim 1, wherein said first, second and third pixel groups are respectively pixel groups which are sensitive to first second and third colors.

5. A device as in claim 3, wherein said readout logic is also operable in at least one other mode beside said line packed pixel readout mode.

6. A device as in claim 5, wherein said at least one other mode is a parallel packed pixel mode in which the pixels are read out directly from said focal plane array.

7. A device as in claim 4, wherein each of said groups is two rows of linear arrays with pixels in different rows being spaced apart from one another by a predetermined pitch.

8. A device as in claim 7, wherein said predetermined pitch is half a pixel pitch.

9. A device as in claim 1, wherein each of said groups includes a plurality of rows of pixels.

10. A device as in claim 9, wherein each of said groups includes the same color pixels.

11. A device, comprising:
    a focal plane array of photosensitive pixels, each of said photosensitive pixels including a photoreceptor, and at least one in-pixel transistor operating to select a pixel and at least one other in pixel transistor operating to buffer an output of the photosensitive pixel, said focal plane array being arranged into first, second and third groups, it each group representing a different color;
    a plurality of storage elements, separate from said pixels, including first, second and third groups of storage elements respectively configured to store information from said first, second and third pixel groups; and
    readout logic, operating in a line packed pixel mode and in another pixel mode different than said line packed pixel mode.

12. A device as in claim 11, wherein said readout logic is operable during said line packed pixel mode to readout plural pixels of the same color at the same time.

13. A device as in claim 11, wherein said readout logic is operable during said pixel packed pixel mode to read out plural pixels of different colors at the same time.

14. A device as in claim 11, further comprising a correlated double sampling element, operating to determine an old level of charge on a pixel prior to sampling, a level of charge on the pixel after sampling, and a difference between said level prior to sampling and said level after sampling.

* * * * *

UNITED STATES PATENT AND TRADEMARK OFFICE
CERTIFICATE OF CORRECTION

PATENT NO. : 6,507,011 B2
DATED : January 14, 2003
INVENTOR(S) : Lin Ping Ang

It is certified that error appears in the above-identified patent and that said Letters Patent is hereby corrected as shown below:

Column 1,
Line 20, "has" should be -- have --; and
Line 36, "change" should be -- charge --.

Column 2,
Line 32, "typi'cally" should be -- typically --.

Column 10,
Line 47, delete "it".

Signed and Sealed this

Twenty-third Day of September, 2003

JAMES E. ROGAN
*Director of the United States Patent and Trademark Office*